(12) United States Patent
Bannai et al.

(10) Patent No.: US 8,979,255 B2
(45) Date of Patent: Mar. 17, 2015

(54) INK CARTRIDGE AND METHOD OF REPLENISHING INK CARTRIDGE

(71) Applicants: Akiko Bannai, Kanagawa (JP); Tomohiro Inoue, Kanagawa (JP)

(72) Inventors: Akiko Bannai, Kanagawa (JP); Tomohiro Inoue, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/765,776

(22) Filed: Feb. 13, 2013

(65) Prior Publication Data

US 2013/0242009 A1 Sep. 19, 2013

(30) Foreign Application Priority Data

Mar. 14, 2012 (JP) ................. 2012-057491
Jan. 30, 2013 (JP) ................. 2013-015063

(51) Int. Cl.
*B41J 2/17* (2006.01)
*B41J 2/175* (2006.01)
*C09D 11/322* (2014.01)

(52) U.S. Cl.
CPC .......... *B41J 2/17506* (2013.01); *C09D 11/322* (2013.01)
USPC ............................. 347/95; 347/86

(58) Field of Classification Search
USPC .................. 347/19, 95, 100, 85, 86
See application file for complete search history.

(56) References Cited

U.S. PATENT DOCUMENTS

| 5,514,208 | A | 5/1996 | Nagai et al. |
| 5,622,550 | A | 4/1997 | Konishi et al. |
| 5,810,915 | A | 9/1998 | Nagai et al. |
| 5,879,439 | A | 3/1999 | Nagai et al. |
| 5,882,390 | A | 3/1999 | Nagai et al. |
| 5,972,082 | A | 10/1999 | Koyano et al. |
| 5,993,524 | A | 11/1999 | Nagai et al. |
| 6,120,589 | A | 9/2000 | Bannai et al. |
| 6,231,652 | B1 | 5/2001 | Koyano et al. |
| 6,261,349 | B1 | 7/2001 | Nagai et al. |
| 6,613,136 | B1 | 9/2003 | Arita et al. |
| 6,685,296 | B2 * | 2/2004 | Mochizuki et al. ............ 347/19 |
| 7,055,944 | B2 | 6/2006 | Konishi |
| 7,284,851 | B2 | 10/2007 | Bannai et al. |
| 7,370,952 | B2 | 5/2008 | Inoue et al. |
| 7,673,963 | B2 * | 3/2010 | Morimoto ..................... 347/31 |
| 7,682,011 | B2 | 3/2010 | Namba et al. |
| 7,699,457 | B2 | 4/2010 | Namba et al. |
| 7,810,919 | B2 | 10/2010 | Kojima et al. |
| 7,812,068 | B2 | 10/2010 | Habashi et al. |
| 7,950,793 | B2 * | 5/2011 | Aruga et al. .................. 347/100 |
| 8,029,122 | B2 * | 10/2011 | Kojima et al. ................ 347/100 |

(Continued)

FOREIGN PATENT DOCUMENTS

| CN | 1327418 | 12/2001 |
| CN | 1436217 | 8/2003 |

(Continued)

OTHER PUBLICATIONS

Office Action issued in corresponding Chinese Application No. 201310079980.4, dated Aug. 1, 2014.

*Primary Examiner* — Anh T. N. Vo
(74) *Attorney, Agent, or Firm* — Oblon, McClelland, Maier & Neustadt, L.L.P.

(57) ABSTRACT

An ink cartridge including a holding member and an ink bag to accommodate ink, wherein the ink cartridge is replenished with pigment ink having a pH higher than a pH of residual ink remaining in the ink cartridge.

16 Claims, 1 Drawing Sheet

(56) References Cited

U.S. PATENT DOCUMENTS

| | | |
|---|---|---|
| 8,100,504 B2 | 1/2012 | Yokohama et al. |
| 2002/0083866 A1 | 7/2002 | Arita et al. |
| 2002/0096085 A1 | 7/2002 | Gotoh et al. |
| 2003/0064206 A1 | 4/2003 | Koyano et al. |
| 2003/0076394 A1 | 4/2003 | Gotoh et al. |
| 2003/0107632 A1 | 6/2003 | Arita et al. |
| 2005/0007431 A1 | 1/2005 | Koyano et al. |
| 2005/0168552 A1 | 8/2005 | Arita et al. |
| 2006/0176349 A1 | 8/2006 | Nagai et al. |
| 2008/0302268 A1 | 12/2008 | Arita et al. |
| 2010/0020142 A1 | 1/2010 | Bannai et al. |
| 2010/0271435 A1 | 10/2010 | Kojima et al. |
| 2012/0121831 A1 | 5/2012 | Kudoh et al. |
| 2012/0328853 A1 | 12/2012 | Matsuyama et al. |

FOREIGN PATENT DOCUMENTS

| | | | | |
|---|---|---|---|---|
| CN | 101360799 | | 2/2009 | |
| CN | 102203197 | | 9/2011 | |
| JP | 62-117751 | | 5/1987 | |
| JP | 2002-121435 | | 4/2002 | |
| JP | 2002121435 | * | 4/2002 | B41J 2/01 |
| JP | 2006-282810 | * | 10/2006 | B41J 2/01 |
| JP | 2008-179804 | | 8/2008 | |

* cited by examiner

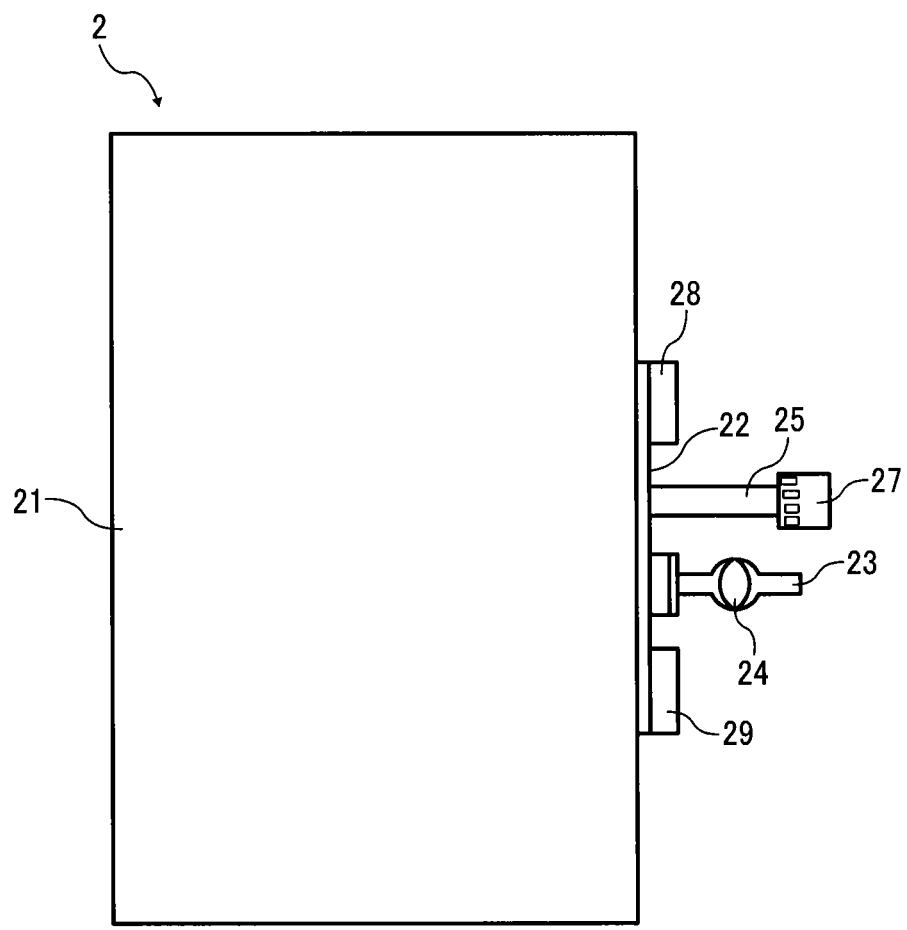

INK CARTRIDGE AND METHOD OF REPLENISHING INK CARTRIDGE

CROSS-REFERENCE TO RELATED APPLICATIONS

This patent application is based on and claims priority pursuant to 35 U.S.C. §119 to Japanese Patent Application Nos. 2012-057491 and 2013-015063, filed on Mar. 14, 2012 and Jan. 30, 2013, respectively, in the Japan Patent Office, the entire disclosures of which are hereby incorporated by reference herein.

BACKGROUND

1. Field

The present invention relates to an ink cartridge and a method of replenishing an ink cartridge with pigment ink.

2. Background Art

It is known to replenish spent ink cartridges with ink.

However, considering problems ascribable to mixing old and new ink, it is necessary to wash the used ink cartridge before replenishing the ink cartridge with ink.

In addition, when the ink cartridge is replenished without washing the ink cartridge, a way must be found to stabilize mixing of the residual ink and the newly added ink.

Since dye ink has been mainly used in ink cartridges, the re-use of such cartridges has been approached mostly in terms of solving problems with regard to replenishment of the ink cartridge with dye ink or pigment ink into or residual ink in an ink absorbent substance provided in the ink cartridge to obtain a negative pressure.

JP-2008-179804-A discloses filling (replenishing) ink having good preservation stability and discharging stability secured by satisfying the following relationship: $B/A \leq 2$, where A represents the number of coarse particles immediately after mixing the newly added ink and residual ink and B, designates the number of coarse particles left for 24 hours.

However, in JP-2008-179804-A, both pigments and dyes are usable as the coloring agent, and neither the pH of the ink nor solution of agglomerated residual pigment ink peculiar to pigment ink were discussed at all.

JP-2002-121435-A discloses a replenishment ink and replenishment method that do not adversely affect the print quality, the ink dischargeability, and the print head, in which the relation of the surface tension, pH, and viscosity of initial newly added ink and newly added ink are regulated.

However, in JP-2002-121435-A mentioned above, although pH was included in the three regulated properties, only dye ink was subjected and the newly added ink had a pH lower than that of the initial newly added ink in some cases.

Consequently, JP-2002-121435-A mentioned above is not suitable either to obtain stable mixing with the newly added ink or to dissolve agglomerated residual ink for an ink cartridge using pigment ink.

SUMMARY

The present invention provides an ink cartridge including a holding member and an ink bag to accommodate ink, wherein the ink cartridge is replenished with pigment ink having a pH higher than a pH of residual ink remaining in the ink cartridge.

As another aspect of the present invention, a method of replenishing an ink cartridge is provided which includes a method of replenishing an ink cartridge including filling the ink cartridge with pigment ink having a pH higher than a pH of the residual ink remaining in the ink cartridge.

BRIEF DESCRIPTION OF THE DRAWINGS

Various other objects, features and attendant advantages of the present invention will be more fully appreciated as the same become better understood from the detailed description when considered in connection with the accompanying drawing, in which like reference characters designate like corresponding parts throughout and wherein FIGURE is a diagram illustrating an example of an ink bag contained in an ink cartridge.

DETAILED DESCRIPTION

The present disclosure will be described below in detail with reference to several embodiments and the accompanying drawing.

The pH of the initial ink is typically adjusted by color in the range in which the dispersion stability of the pigment used in the ink is secured.

Alternatively, the pH range is adjusted considering impacts on members used in the ink path.

In terms of uniformity of the constituting members, the ranges are preferably close in some degree.

With regard to the ink with which the ink cartridge is filled, initially its pH is stably maintained because the ink cartridge is sealed.

However, once the ink cartridge is used, the pH thereof tends to decrease by influence of $CO_2$ in the atmosphere since the ink cartridge is not air-tight any more.

In particular, as the ink in the ink cartridge is consumed, the amount of remaining ink reduces, so that the specific surface of the residual ink exposed to the air increases, which accelerates this decrease of the pH.

Moreover, considering the usage environment and the usage period of time of the ink cartridge after it is open, the pH of the ink remaining in the ink cartridge considerably varies.

Consequently, in a case of pigment ink sensitive to the pH change, it is highly probable that the residual ink agglomerates.

In such a case, if pigment ink having a pH higher than that of the pigment ink with which the ink cartridge is initially filled is added to the ink cartridge as in the present disclosure, the agglomerated matter deriving from the residual pigment ink remaining in the ink cartridge is dissolved, so that the ink cartridge is re-used.

This makes it possible to conduct replenishment of ink without washing the inside of the ink cartridge.

In addition, the pH of the pigment ink can be adjusted in a pH range in which the stability of the pigment ink is secured while preventing the pH from decreasing caused by the residual pigment ink.

Moreover, if the pH of the pigment ink lowers, the members of the ink flowing path are adversely affected in most cases.

However, when the pigment ink is mixed with the residual pigment ink having a decreased pH, the pH of the resultant pigment ink mixture is maintained in a suitable range because the pH of the pigment ink is high, thereby avoiding the adverse impact on the members of the ink flowing path.

The number times of filling the ink cartridge with the pigment ink is not limited to once.

It is possible to fill the ink cartridge several times with ink unless the cartridge is damaged.

The method of replenishment is the same as the first time.

There is no specific limit to the pH adjustment of the pigment ink.

For example, a pH controlling agent is used.

The composition of the pigment ink for use is preferably, but not limited to, the same as that of typical pigment ink except for the pH controlling agent optionally added to adjust the pH.

That is, the pigment ink to be filled with contains a pigment, a wetting agent, a surface active agent, and optional other additives such as a permeating agent.

The pigment ink typically has a pH of from about 9 to about 10 and a viscosity of from about 7.5 mPa·s to about 8.5 mPa·s at 25° C. although depending on the kind of the pigment.

The pH of the pigment ink is preferably 9.0 or higher.

When the pH is too low, the ability of dissolving the agglomerated matter in the residual pigment ink may deteriorate or the ink dischargeability tends to deteriorate due to the pH decrease over time.

Pigment (Coloring Agent)

There is no specific limit to the pigment for use in the pigment ink and any known inorganic pigment and organic pigment can be used.

As the inorganic pigments, in addition to titanium oxide, iron oxide, calcium oxide, barium sulfate, aluminum hydroxide, barium yellow, cadmium red, and chrome yellow, carbon black manufactured by known methods such as contact methods, furnace methods, and thermal methods can be used.

Specific examples of the organic pigments include, but are not limited to, azo pigments (azo lakes, insoluble azo pigments, condensed azo pigments, chelate azo pigments, etc.), polycyclic pigments (phthalocyanine pigments, perylene pigments, perinone pigments, anthraquinone pigments, quinacridone pigments, dioxazine pigments, indigo pigments, thioindigo pigments, isoindolinone pigments, and quinofuranone pigments, etc.), dye chelates (basic dye type chelates, acid dye type chelates), nitro pigments, nitroso pigments, and aniline black can be used.

Among these pigments, pigments having good affinity with water are preferable in particular.

More preferred specific examples of the pigments for black include, but are not limited to, carbon black (C.I. Pigment Black 7) such as furnace black, lamp black, acetylene black, and channel black, metals such as copper and iron (C.I. Pigment Black 11), metal oxides compounds such as titanium oxide, and organic pigments such as aniline black (C.I. Pigment Black 1).

Specific examples of the pigments for color include, but are not limited to, C.I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 128, 138, 150, 151, 153, and 183; C.I. Pigment Orange 5, 13, 16, 17, 36, 43, and 51; C.I. Pigment Red 1, 2, 3, 5, 17, 22, 23, 31, 38, 48:2, 48:2 {Permanent Red 2B(Ca)}, 48:3, 48:4, 49:1, 52:2, 53:1, 57:1 (Brilliant Carmine 6B), 60:1, 63:1, 63:2, 64:1, 81, 83, 88, 101 (rouge), 104, 105, 106, 108 (Cadmium Red), 112, 114, 122 (Quinacridone Magenta), 123, 146, 149, 166, 168, 170, 172, 177, 178, 179, 185, 190, 193, 209, and 219; C.I. Pigment Violet 1 (Rohdamine Lake), 3, 5:1, 16, 19, 23, and 38; C.I. Pigment Blue 1, 2, 15, 15:1, 15:3 (Phthalocyanine Blue), 16, 17:1, 56, 60, and 63; C.I. Pigment Green 1, 4, 7, 8, 10, 17, 18, and 36.

Among the pigments, surface-reformed pigments are preferable which have at least one hydrophilic group is bonded on the surface of the pigment directly or via another atom group.

To conduct this surface reforming, there is used a method of chemically bonding a particular functional group (such as sulfonic acid group or carboxyl group) on the surface of the pigment or a method of wet-oxidizing hypohalous acid and/or a salt thereof.

Among these, a form is preferable in which a carboxyl group is bonded on the surface of the pigment which is dispersed in water. In the case of this pigment, printing quality is improved and water resistance of the recording media after printing is improved in addition to improvement of the dispersion stability.

In addition, since the ink that uses the pigment having this form has an excellent re-dispersibility after drying, clogging does not occur even when the ink moisture around the inkjet head nozzles evaporates while the printing device is suspended for an extended period of time.

Therefore, quality images can be produced by a simple cleaning operation. Moreover, this self-dispersible type pigment has a synergy effect in particular when used in combination with the surface active agent and the penetrating agent described later, thereby producing quality images with more reliability.

In addition to the pigment having the form specified above, it is preferable to use a polymer emulsion in which polymer particulates contain a coloring material not or little soluble in water.

"The polymer emulsion in which polymer particulates contain a coloring material" means an emulsion in which the coloring material is encapsulated in the polymer particulates and/or adsorbed on the surface of the polymer particulates.

In this case, it is not necessary that all the coloring materials are encapsulated and/or adsorbed and some of the coloring materials may be dispersed in the emulsion unless they have an adverse impact on the effect of the present disclosure.

There is no specific limit to the coloring material as long as it is not or little soluble in water and can be contained in the polymer.

For example, dyes such as oil-soluble dyes and dispersible dyes and pigments specified above are suitable.

Among these, the pigments are preferable in terms of the light resistance of the obtained recording material.

Specific examples of the polymers forming the polymer emulsions include, but are not limited to, vinyl-based polymers, polyester-based polymers, and polyurethane-based polymers.

Among these, the vinyl-based polymers and the polyester-based polymers are particularly preferable.

Moreover, in the present disclosure, it is possible to use a pigment which is dispersed in an aqueous medium by a dispersant in combination.

Any known dispersant to adjust a pigment liquid dispersion is suitably usable.

Specific examples of thereof include, but are not limited to, polyacrylic acids, polymethacrylic acids, copolymers of acrylic acid and acrylic nitrile, copolymers of vinyl acetate and alkyl ester, copolymers of acrylic acid and acrylic acid alkyl ester, copolymers of styrene and acrylic acid, copolymers of styrene and methacrylic acid, copolymers of styrene, acrylic acid, and acrylic acid alkyl ester, copolymers of styrene, methacrylic acid, and acrylic acid alkyl ester, copolymers of styrene, α-methyl styrene, and acrylic acid, copolymers of styrene, α-methyl styrene, acrylic acid, and acrylic acid alkyl ester, copolymers of styrene and maleic acid, copolymers of vinyl naphthalene and maleic acid, copolymers of vinyl acetate and ethylene, copolymers of vinyl acetate and vinyl ethylene aliphatic acid, copolymers of vinyl acetate and maleic ester, copolymers of vinyl acetate and crotonic acid, and copolymers of vinyl acetate and acrylic acid.

The weight average molecular weight of these polymers or copolymers is preferably from 3,000 to 50,000, more preferably from 5,000 to 30,000, and furthermore preferably from 7,000 to 15,000.

The addition amount of the dispersant is determined in a range in which the pigment is stably dispersed and the present disclosure is not adversely affected.

Typically, the weight ratio of the pigment to the dispersant is preferably from 1:0.06 to 1:3 and more preferably from 1:0.125 to 1:3.

Furthermore, it is preferable that a carboxylic group is bonded to the dispersant in the pigment ink.

Since a carboxylic acid is bonded with the dispersant, printing quality is improved and water resistance of the recording media after printing is improved in addition to improvement of the dispersion stability.

Moreover, strike-through is prevented.

In particular, even when a pigment dispersed by a dispersant to which a carboxylic group is bonded is used in combination with a penetrating agent for printing on a recording medium having a relatively high sizing degree such as plain paper, the drying speed is sufficient with little-strike-through.

This is inferred that, since the dissociation constant of carboxylic acid is relatively small in comparison with those of other acid groups, the solubility of the dispersant decreases and the dispersant and the pigment agglomerate because of the decrease of the pH value of the pigment ink and the interaction with a polyvalent metal ion such as calcium present around the surface of a recording medium after the pigment is attached to the recording medium.

The addition amount of the pigment is preferably from about 0.5% by weight to about 15% by weight and more preferably from 5% by weight to about 12% by weight.

In addition, the volume average particle diameter of the pigment in the pigment ink is from 10 nm to 200 nm.

The volume average particle diameter in the present disclosure represents the 50% particle diameter.

The 50% particle diameter and the 90% particle diameter are determined as the particle diameters of the points where the accumulation curves of the particle size distribution based on the volume are 50% and 90%, respectively.

The value of the volume accumulation percent of 50% can be measured by, for example, a so-called dynamic light scattering method which includes irradiating particles conducting Brownian motion in ink with a laser beam to obtain a particle diameter from the variation of the frequency of light (backscattered light) returning from the particle.

When the volume average particle diameter is too small, the dispersion stability in the pigment ink tends to deteriorate and the image density of a printed image tends to be inferior. Moreover, particularizing the pigment to that size level invites a cost increase.

When the volume average particle diameter is too large, image fixability tends to deteriorate and agglomeration tends to occur while preserved for a long period of time, which leads to clogging.

pH Controlling Agent pH affects the agglomeration of the pigment depending on the kind thereof.

In particular, pigments that are used to obtain quality images by causing agglomeration by the pH change to increase the viscosity on paper on which an image is printed tend to deteriorate about the dispersion stability on the pH change, so that it is difficult to secure the dispersion stability.

Any pH controlling agent that secures the dispersion stability of a pigment while adjusting the pH to a desired value without having an adverse impact on prescribed liquid for recording is suitably usable.

Specific examples of such pH controlling agents include, but are not limited to, amines such as diethanol amine and triethanol amine, hydroxides of alkali metal elements such as lithium hydroxide, sodium hydroxide, and potassium hydroxide; ammonium hydroxide, quaternary ammonium hydroxide, quaternary phosphonium hydroxide, and carbonates of alkali metals such as lithium carbonate, sodium carbonate, and potassium carbonate.

Alkane diol type pH controlling agents having amino groups are particularly preferable and specific examples thereof include, but are not limited to, 1-methylamino-2,3-propane diol, 1-amino-2,3-propane diol, 1-amino-2-ethyl-2,3-propane diol, 2-amino-2-methyl-1,3-propane diol, 2-amino-2-ethyl-1,3-propane diol, and 2-amino-2,3-propane diol.

Among these, considering the impact on the ink flowing paths, etc., 2-amino-2-ethyl-1,3-propane diol (herein after referred to as AEPD) is preferable.

The mechanism of the effects demonstrated by AEPD is not clear but it is inferred that in a case of a self-dispersible type pigment, there is no problem about agglomeration but a low pH may cause an adverse impact on the ink flowing members but AEPD reduces this impact.

In addition, if a pigment is covered with a resin and AEPD is added, agglomeration of the ink is prevented.

This is thought to be because $\zeta$ voltage of the surface of the pigment is stabilized by the addition of AEPD. Furthermore, even in a case in which the pigment once agglomerates, AEPD is considered to have an effect of easily re-dispersing the pigment due to the interaction with the resin.

The pH of the pigment ink is required to be higher than that of the residual pigment ink in the ink cartridge.

The rough standard is 0.5 to 1.5 higher than that of the residual pigment ink.

When the pH of the pigment ink is higher but close to (for example, less than 0.5) that of the residual pigment ink, the discharging stability tends to be not secured when the pH lowers again during the use although it depends on the state of the residual pigment ink.

The pH buffering feature changes depending on the kind of the pigments.

It is suitable to set a relatively high pH for pigment ink having a low buffering feature.

In addition, a desirable upper limit of pH is 10.5.

A pH that surpasses 10.5 has an adverse impact on the ink flowing path and may break the dispersion stability of the pigment ink.

Wetting Agent

There is no specific limit to the wetting agent.

Polylol alkyl ethers and polyol aryl ethers are preferable. Such a wetting agent prevents the pigment ink from evaporating and precipitating at the ink discharging mouth and stops the discharging performance from deteriorating caused by viscosity increase.

Consequently, ink having a high discharging reliability is obtained.

Specific examples of the polyol alkyl ethers include, but are not limited to, ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether.

Specific examples of the polyol aryl ethers include, but are not limited to, ethylene glycol monophenyl ether and ethylene glycol monobenzyl ether.

The addition amount of the wetting agent is preferably from 5% by weight to 30% by weight and more preferably from 10% by weight to about 30% by weight.

When the addition amount of the wetting agent is too small, its using effect tends to be poor.

When the addition amount of the wetting agent is too large, the viscosity of the ink easily increases, thereby adversely affecting the discharging stability.

Moreover, an aqueous organic solvent can be used in combination with the wetting agent to prevent evaporation of ink.

Specific examples of the aqueous organic solvent include, but are not limited to, the following:

polyols such as ethylene glycol, diethylene glycol, triethylene glycol, polyethylene glycol, polypropylene glycol, 3-butane diol, 1-pentane diol, 1,6-hexane diol, glycerol, 1,2,6-hexane triol, 1,2,4-butane triol, 1,2,3-butane triol, and petriol; nitrogen-containing heteroyclic compounds such as N-methyl-2-pyrroridone, N-hydroxyethyl-2-pyrroridone, 2-pyrroridone, 3-dimethyl imidazolidinone, and ϵ-caprolactam; amides such as formamides, N-methylformamides, formamides, and N,N-dimethyl formamide; amines such as monoethanol amine, diethanol amine, triethanol amine, monoethyl amine, diethyl amine, and triethyl amine; sulfur-containing compounds such as dimethyl sulphoxide, sulfolane, and thiodiethanol; propylene carbonate, ethylene carbonate, and γ-buthylolactone.

Surface Active Agent

A surface active agent is added to the pigment ink to increase the penetration property to paper and drying speed and obtain quality images while reducing text blurring and boundary blurring.

There is no specific limit to the kinds of the surface active agent.

Nonion surface active agents, anion surface active agents, and ampholytic surface active agents are suitably usable.

Nonion surface active agents and/or anion surface active agents are preferable. Polyoxyethylene alkyl ether-based surface active agents and/or polyoxyethylene alkyl ether acetate-based surface active agents are more preferable.

These can be used alone or in combination.

Even when a single surface active agent is not easily dissolved, a mixture can be easily dissolved and stably present.

It is preferable to refine and remove inorganic salts produced as by-products during synthesis by an ion-exchange resin.

Specific examples of the products available from the market which contains the surface active agent as the major component include, but are not limited to, BT series available from NIKKO CHEMICALS CO., LTD., SOFTANOL series available from NIPPON SHOKUBAI CO., LTD., DISPANOL available from NOF CORPORATION, NIKKOL ECT series and NIKKOL AKYPO series available from NIKKO CHEMICALS CO., LTD., and BEAULIGHT series from SANYO CHEMICAL INDUSTRIES LTD.

The addition amount of the surface active agent is preferably from 0.01% by weight to 5.0% by weight and more preferably from 0.5% by weight to 3% by weight.

When the content is too small, the surface active agent is difficult to demonstrate its effect.

When the content is too large, penetration to a recording medium tends to become excessively high, resulting in reduction of image density and occurrence of strike-through.

Other Additives

In addition to the components mentioned above, penetrating agents, defoaming agents, anti-septic and anti-fungal agents, anti-corrosion agents, anti-oxidants, ultraviolet absorbents, oxygen absorbents, light stabilizing agents, etc., can be added to the pigment ink.

Penetrating Agent

The penetrating agent is added to improve the penetration property of the pigment ink. The penetrating agent can reduce blurring even when images are printed at a high speed and improve the discharging stability and discharging response.

Polyol compounds, glycol ether compounds are suitable as the penetrating agent.

Polyol compounds and glycol ether compounds having eight or more carbon atoms are particularly preferable.

When the number of carbon atoms of the polyol compound is not enough, for example, less than eight, the penetration feature is not sufficient.

This tends to cause contamination of recording media in the duplex printing mode and degradation of the text quality and image density since the ink does not spread on the recording media sufficiently so that the pixels do not cover the media properly.

Specific examples of the polyol compounds having eight or more carbon atoms include, but are not limited to, 2-ethyl-1,3-hexane diol and 2,2,4-trimethyl-1,3-pentane diol Specific examples of the glycol ether compounds include, but are not limited to, polyol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; and polyol aryl ethers such as ethylene glycol monophenyl ether and ethylene glycol monobenzyl ether.

There is no specific limit to the addition amount of the penetrating agent.

The addition amount preferably ranges from 0.1% by weight to 20% by weight and more preferably ranges from 0.5% weight to 10% by weight.

Defoaming Agent

Silicone-based defoaming agents are excellent about foam-breaking.

There are oil type, compound type, self-emulsion type, and emulsion type.

Considering the use in an aqueous system, the self-emulsion type or the emulsion type are preferable to secure the reliability.

In addition, it is suitable to use modified silicone defoaming agents such as amino-modified silicone defoaming agents, polyether-modified silicone defoaming agents, alkyl-modified silicone defoaming agents, higher aliphatic acid ester-modified silicone defoaming agents, and alkylene oxide-modified silicone defoaming agents.

The content of the defoaming agent can be suitably determined and is preferably of from 0.001% by weight to 3% by weight and more preferably from 0.05% by weight to 0.5% by weight.

Specific examples of the silicone defoaming agents available from the market include, but are not limited to, KS508, KS531, KM72, and KM85 available from Shin-Etsu Chemical CO., LTD., Q2-3183A and SH5510 available from DOW CORNING TORAY CO., LTD., SAG30 manufactured by NIPPON UNICAR COMPANY LIMITED, and ADEKANATE series available from ADEKA CORPORATION.

Anti-Septic and Anti-Fungal Agent

Specific examples of the anti-septic and anti-fungal agents include, but are not limited, 2-benzisothiazoline-3-on, dehydrosodium acetate, sodium sorbinate, 2-pyridine thiol-1-oxide sodium, sodium benzoate, and pentachlorophenol sodium.

Anti-Corrosion Agent

Specific examples of the anti-corrosion agents include, but are not limited to, acid sulfite, thiosodium sulfate, ammonium thiodiglycolate, diisopropyl ammonium nitrite, pentaerythritol quaternary nitrite, and dicyclohexyl ammonium nitrite.

Anti-Oxidant

Specific examples of the anti-oxidants include, but are not limited to, phenol-based anti-oxidants (including hindered phenol-based anti-oxidants), amino-based anti-oxidants, sulfur-based anti-oxidants, and phosphorous-based anti-oxidants.

The pigment ink is prepared by dispersing or dissolving at least a coloring agent, a wetting agent, a surface active agent, and other optional additives such as a pH controlling agent in an aqueous medium while stirring and mixing, if desired.

This dispersion is conducted by a sand mill, a roll mill, a homogenizer, a ball mill, a paint shaker, an ultrasonic dispersing agent, etc.

The stirring and mixing can be conducted by a stirrer having a typical stirring wing, a magnetic stirrer, a high speed dispersing device, a static mixer, etc.

Ink Cartridge

Typically, ink cartridges contain ink bags inside.

FIGURE is a diagram illustrating an ink bag contained in an ink cartridge.

An ink bag 2 has a flexible aluminum laminate film bag 21 having a substantially rectangle form and a holding member 22 made of a resin to which the bag 21 is fixated. The form of the bag 21 is not limited to a specific form such as a rectangle form, and alternatively may be a ball or an oval, for example. In addition, although in the present embodiment the bag 21 is formed of aluminum laminate film, the material of the bag 21 is not limited thereto. However, in terms of the sealing property, it is preferable to use a member containing at least some aluminum laminate film.

A tube-like opening portion (supply port) 23 for ink filling which has a through-hole inside is integrally molded to the holding member 22 to supply the ink to the bag 21. The through-hole is sealed in the middle by melting the middle portion of the supply port 23 like a sealing portion 24.

In addition, a tube-like opening portion (ink supplying mouth) 25 for ink supplying which has a through-hole inside is integrally molded to the holding member 22 to supply (replenish) the ink inside the bag 21 to a recording device.

The front portion of this ink supplying mouth 25 is capped by a cap 27 that holds an elastic substance 26 such as rubber inside.

A hollow needle is used to pierce the elastic substance 26 from the recording device side to make it possible to supply the ink to the recording device while keeping the sealed state. To facilitate attaching and detaching the ink bag 2 to and from the recording device, the ink bag 2 is accommodated in a hard case in most cases. Engaging members 28 and 29 are integrally formed on the holding member 22 to engage the holding member 22 with the hard case.

In the ink cartridge described above, if the bag folds, the ink tends to remain stuck in the folds. Such remnants of the pigment easily agglomerate if left for an extended period of time. Consequently, the ink bag is washed before re-use. However, by using the pigment ink for use in the present disclosure, the agglomerated pigment ink is dissolved, thereby making it possible to re-use the ink bag without washing.

The ink cartridge of the present disclosure is manufactured by, for example, a method having the following processes of (1) or (2): There is no specific limit to when measuring the pH.
(1) A process of manufacturing pigment ink having a pH higher than the pH of the residual pigment ink remaining in the ink cartridge; and a process of filling the ink cartridge with the pigment ink: or
(2) A process of manufacturing pigment ink having a pH higher than the pH of the residual pigment ink remaining in the ink cartridge by adding a pH controlling agent; and a process of filling the ink cartridge with the pigment ink:

As described above, once an ink cartridge is used, the ink therein contacts with $CO_2$ in the atmospheric air, resulting in a decrease of the pH of the residual ink remaining in the ink cartridge.

However, if the ink cartridge is re-filled with the newly added ink having a pH higher than the ink initially contained in the ink cartridge, it is possible to reuse the ink cartridge even without washing.

In the case in which ink containing a pigment, a wetting agent, a surface active agent, and a pH controlling agent is used as the re-filing pigment ink, if the ink in the ink cartridge is preserved at 60° C. for one month after filling and has a pH of 8.3 or higher with a 90% particle diameter of 190 nm or less, it is possible to suitably avoid an adverse impact on the members of the ink flowing path and prevent agglomeration of the ink, so that desired dispersion state is maintained.

The 90% particle diameter is determined as the particle diameter of the point where the accumulation curve of the particle size distribution based on the volume is 90%.

Consequently, good discharging stability is achieved.

Having generally described preferred embodiments of this invention, further understanding can be obtained by reference to certain specific examples which are provided herein for the purpose of illustration only and are not intended to be limiting.

In the descriptions in the following examples, the numbers represent weight ratios in parts, unless otherwise specified.

EXAMPLES

Next, the present disclosure is described in detail with reference to Examples and Comparative Examples but not limited thereto.

Cartridges 1 to 4 Containing Residual Pigment Ink

Fill ink cartridges with proper four color pigment inks (BLACK GC21KH, YELLOW GC21YH, MAGENTA GC21MH, and CYAN GC21CH) for a gel jet printer (IPSiO GX500, manufactured by RICOH CO., LTD.) and print images.

After the ink cartridges are used up, preserve them at 70° C. for two weeks.

This preservation conditions are for an acceleration test.

Each cartridge after preservation is referred to as "the cartridge containing residual pigment ink".

"The cartridge containing residual pigment ink 1" (black ink cartridge), "the cartridge containing residual pigment ink 2" (yellow ink cartridge), "the cartridge containing residual pigment ink 3" (magenta ink cartridge), and "the cartridge containing residual pigment ink 4" (cyan ink cartridge) are used for evaluation, The black ink remaining in the cartridge after the preservation is referred to as "residual pigment ink 1", the yellow ink remaining in the cartridge after the preservation is referred to as "residual pigment ink 2", the magenta ink remaining in the cartridge after the preservation is referred to as "residual pigment ink 3", and the cyan ink remaining in the cartridge after the preservation is referred to as "residual pigment ink 4".

These are also used for evaluation.

Evaluation 1: Evaluation on Residual Pigment Inks 1 to 4

Measure the number of coarse particles, 90% particle diameter, and pH of the residual pigment inks.

The results are shown in Table 1.

Use AccuSizer 780 (manufactured by PARTICLE SIZING SYSTEMS CO., LTD.) to measure the number of coarse particle diameters having a particle diameter of 0.5 μm or greater present in 5 μl of each residual pigment ink.

Use MICROTRAC UPA 150 (manufactured by NIKKISO CO., LTD.) to measure the 90% particle diameter after diluting with pure water.

Use a pH meter (HM-30R, manufactured by DKK-TOA CORPORATION) to measure the pH.

TABLE 1

| | Number of coarse particles | 90% particle diameter | pH |
|---|---|---|---|
| Remaining pigment ink 1 | $3.8 \times 10^5$ | 196 | 8.4 |
| Remaining pigment ink 2 | $18.9 \times 10^5$ | 216 | 9.3 |
| Remaining pigment ink 3 | $8.6 \times 10^5$ | 173 | 8.9 |
| Remaining pigment ink 4 | $51.4 \times 10^5$ | 196 | 9.2 |

Preparation of Re-filling Pigment Ink 1 (Black Ink)

Stir the following recipe once and add AEPD to adjust the pH to be 9.8.

Thereafter, stir the system sufficiently at room temperature followed by filtration using a membrane filter having an average opening diameter of 1.5 μm to obtain [Re-filling Pigment Ink 1].

| | |
|---|---|
| KM-9036 (self-dispersible type, manufactured by TOYO INK CO., LTD.) | 40% by weight |
| Glycerin | 10% by weight |
| Diethylene glycol | 20% by weight |
| 2-pyrroridone | 2% by weight |
| SOFTANOL EP7025 (manufactured by NIPPON SHOKUBAI CO., LTD.) | 1% by weight |
| Deionized water | 27% by weight |

Preparation of Yellow Pigment Liquid Dispersion 1

Mix the following recipe followed by dispersion by wet-type sand mill.

Remove coarse particles by centrifugal treatment to prepare [Yellow Pigment Liquid Dispersion 1].

| | |
|---|---|
| C.I. Pigment Yellow 97 | 30% by weight |
| Polyoxyethylene oleyl ether ammonium sulfate | 15% by weight |
| Ethylene glycol | 30% by weight |
| Pure water | 25% by weight |

Preparation of Magenta Pigment Liquid Dispersion 2

Mix the following recipe followed by dispersion by three-roll mill to prepare [Magenta Pigment Liquid Dispersion 2].

| | |
|---|---|
| C.I. Pigment Red 122 | 30% by weight |
| Polyoxyethylene oleyl ether ammonium sulfate | 15% by weight |
| Glycerin | 30% by weight |
| Pure water | 25% by weight |

Preparation of Cyan Pigment Liquid Dispersion 3

Mix the following recipe followed by dispersion by a wet-type sand mill to prepare [Cyan Pigment Liquid Dispersion 3].

| | |
|---|---|
| C.I. Pigment Blue 15:3 | 30% by weight |
| Polyoxyethylene oleyl ether ammonium sulfate | 15% by weight |
| Ethylene glycol | 30% by weight |
| Pure water | 25% by weight |

Preparation of Re-filling Pigment Ink 2 (Yellow Ink)

Stir the following recipe once and add AEPD to adjust the pH to be 9.8.

Thereafter, stir the system sufficiently at room temperature followed by filtration using a membrane filter having an average opening diameter of 1.5 μm to obtain [Re-filling Pigment Ink 2]

| | |
|---|---|
| Yellow Pigment Liquid Dispersion 1 | 15% by weight |
| Glycerin | 8% by weight |
| Diethylene glycol | 20% by weight |
| 2-pyrroridone | 2% by weight |
| SOFTANOL EP7025 (manufactured by NIPPON SHOKUBAI CO., LTD.) | 1% by weight |
| Deionized water | 54% by weight |

Preparation of Re-filling Pigment Ink 3 (Magenta Ink)

Stir the following recipe once and add AEPD to adjust the pH to be 9.5.

Thereafter, stir the system sufficiently at room temperature followed by filtration using a membrane filter having an average opening diameter of 1.5 μm to obtain [Re-filling Pigment Ink 3].

| | |
|---|---|
| Magenta Pigment Liquid Dispersion 2 | 15% by weight |
| Glycerin | 8% by weight |
| Diethylene glycol | 20% by weight |
| 2-pyrroridone | 2% by weight |
| SOFTANOL EP7025 (manufactured by NIPPON SHOKUBAI CO., LTD.) | 1% by weight |
| Deionized water | 54% by weight |

Preparation of Re-filling Pigment Ink 4 (Cyan Ink)

Stir the following recipe once and add AEPD to adjust the pH to be 10.2.

Thereafter, stir the system sufficiently at room temperature followed by filtration using a membrane filter having an average opening diameter of 1.5 μm to obtain [Re-filling Pigment Ink 4].

| | |
|---|---|
| Cyan Pigment Liquid Dispersion 3 | 15% by weight |
| Glycerin | 8% by weight |
| Diethylene glycol | 20% by weight |
| 2-pyrroridone | 2% by weight |
| SOFTANOL EP7025 (manufactured by NIPPON SHOKUBAI CO., LTD.) | 1% by weight |
| Deionized water | 54% by weight |

Preparation of Re-filling Pigment Ink 5 (Black Ink)

Stir the following recipe once and add AEPD to adjust the pH to be 9.8.

Thereafter, stir the system sufficiently at room temperature followed by filtration using a membrane filter having an average opening diameter of 1.5 μm to obtain [Re-filling Pigment Ink 5].

| | |
|---|---|
| KM-9036 (self-dispersible type, manufactured by TOYO INK CO., LTD.) | 40% by weight |
| Glycerin | 10% by weight |
| Diethylene glycol | 20% by weight |
| 2-pyrroridone | 2% by weight |
| SOFTANOL EP7025 (manufactured by NIPPON SHOKUBAI CO., LTD.) | 1% by weight |
| Deionized water | 27% by weight |

Preparation of Re-filling Pigment Ink 6 (Black Ink)

Stir the following recipe once and add 1N sodium hydroxide solution to adjust the pH to be 9.8.

Thereafter, stir the system sufficiently at room temperature followed by filtration using a membrane filter having an average opening diameter of 1.5 μm to obtain [Re-filling Pigment Ink 6].

| | |
|---|---|
| KM-9036 (self-dispersible type, manufactured by TOYO INK CO., LTD.) | 40% by weight |
| Glycerin | 10% by weight |
| Diethylene glycol | 20% by weight |
| 2-pyrroridone | 2% by weight |
| SURFYNOL ® 465 (manufactured by AIR PRODUCTS AND CHEMICALS, INC.) | 1% by weight |
| Deionized water | 27% by weight |

Preparation of Re-filling Pigment Ink 7 (Black Ink)

Stir the following recipe once and add AEPD to adjust the pH to be 8.8.

Thereafter, stir the system sufficiently at room temperature followed by filtration using a membrane filter having an average opening diameter of 1.5 μm to obtain [Re-filling Pigment Ink 7].

| | |
|---|---|
| KM-9036 (self-dispersible type, manufactured by TOYO INK CO., LTD.) | 40% by weight |
| Glycerin | 10% by weight |
| Diethylene glycol | 20% by weight |
| 2-pyrroridone | 2% by weight |
| SOFTANOL EP7025 (manufactured by NIPPON SHOKUBAI CO., LTD.) | 1% by weight |
| Deionized water | 27% by weight |

Preparation of Re-filling Pigment Ink 8 (Black Ink)

Stir the following recipe sufficiently at room temperature followed by filtration by a membrane filter having an average opening diameter of 1.5 μm to obtain [Re-filling Pigment Ink 8] having a pH of 7.2.

| | |
|---|---|
| KM-9036 (self-dispersible type, manufactured by TOYO INK CO., LTD.) | 40% by weight |
| Glycerin | 10% by weight |
| Diethylene glycol | 20% by weight |
| 2-pyrroridone | 2% by weight |
| SURFYNOL ® 465 (manufactured by AIR PRODUCTS AND CHEMICALS, INC.) | 1% by weight |
| Deionized water | 27% by weight |

Preparation of Re-filling Pigment Ink 9 (Yellow Ink)

Stir the following recipe sufficiently at room temperature followed by filtration by a membrane filter having an average opening diameter of 1.5 μm to obtain [Re-filling Pigment Ink 9] having a pH of 7.7.

| | |
|---|---|
| Yellow Pigment Liquid Dispersion 1 | 15% by weight |
| Glycerin | 8% by weight |
| Diethylene glycol | 20% by weight |
| 2-pyrroridone | 2% by weight |
| SOFTANOL EP7025 (manufactured by NIPPON SHOKUBAI CO., LTD.) | 1% by weight |
| Deionized water | 54% by weight |

Preparation of Re-filling Pigment Ink 10 (Magenta Ink)

Stir the following recipe sufficiently at room temperature followed by filtration by a membrane filter having an average opening diameter of 1.5 μm to obtain [Re-filling Pigment Ink 10] having a pH of 7.0.

| | |
|---|---|
| Magenta Pigment Liquid Dispersion 2 | 15% by weight |
| Glycerin | 8% by weight |
| Diethylene glycol | 20% by weight |
| 2-pyrroridone | 2% by weight |
| SOFTANOL EP7025 (manufactured by NIPPON SHOKUBAI CO., LTD.) | 1% by weight |
| Deionized water | 54% by weight |

Preparation of Re-filling Pigment Ink 11 (Cyan Ink)

Stir the following recipe sufficiently at room temperature followed by filtration by a membrane filter having an average opening diameter of 1.5 μm to obtain [Re-filling Pigment Ink 11] having a pH of 7.1.

| | |
|---|---|
| Cyan Pigment Liquid Dispersion 3 | 15% by weight |
| Glycerin | 8% by weight |
| Diethylene glycol | 20% by weight |
| 2-pyrroridone | 2% by weight |
| SOFTANOL EP7025 (manufactured by NIPPON SHOKUBAI CO., LTD.) | 1% by weight |
| Deionized water | 54% by weight |

Examples 1 to 7 and Comparative Examples 1 to 4

Fill the ink cartridges 1 to 4 containing the residual ink with the pigment inks 1 to 10 for Examples and Comparative Examples.

Subsequent to filling, mix the ink contained in the ink cartridges by ultrasonic wave for 30 seconds.

It is possible to shake an ink cartridge by ultrasonic to mix the ink but other shaking methods and mixing methods are applicable.

TABLE 2

| | Cartridge | Residual pigment ink pH | Pigment ink | pH of Pigment ink |
|---|---|---|---|---|
| Example 1 | Cartridge 1 containing residual pigment ink | 8.4 | Pigment ink 1 | 9.8 |
| Example 2 | Cartridge 2 containing residual pigment ink | 9.3 | Pigment ink 2 | 9.8 |
| Example 3 | Cartridge 3 containing residual pigment ink | 8.9 | Pigment ink 3 | 9.5 |
| Example 4 | Cartridge 4 containing | 9.2 | Pigment ink 4 | 10.2 |

TABLE 2-continued

| | Cartridge | Residual pigment ink pH | Pigment ink | pH of Pigment ink |
|---|---|---|---|---|
| Example 5 | Cartridge 1 containing residual pigment ink | 8.4 | Pigment ink 5 | 9.8 |
| Example 6 | Cartridge 1 containing residual pigment ink | 8.4 | Pigment ink 6 | 9.8 |
| Example 7 | Cartridge 1 containing residual pigment ink | 8.4 | Pigment ink 7 | 8.8 |
| Comparative Example 1 | Cartridge 1 containing residual pigment ink | 8.4 | Pigment ink 8 | 7.2 |
| Comparative Example 2 | Cartridge 2 containing residual pigment ink | 9.3 | Pigment ink 9 | 7.7 |
| Comparative Example 3 | Cartridge 3 containing residual pigment ink | 8.9 | Pigment ink 10 | 7.0 |
| Comparative Example 4 | Cartridge 4 containing residual pigment ink | 9.2 | Pigment ink 11 | 7.1 |

Make the following evaluations on the ink cartridges of Examples and Comparative Examples.

Evaluation 2: Evaluation on Properties of Ink after Re-Filling (Initial)

Measure the number of coarse particles, 90% particle diameter, and pH of the inks after filling.

Use the same measuring methods as specified above for the cases of Table 1.

The results are shown in Table 3.

TABLE 3

| | Number of coarse particles | 90% particle diameter (nm) | pH |
|---|---|---|---|
| Example 1 | $2.6 \times 10^5$ | 174 | 9.2 |
| Example 2 | $5.7 \times 10^5$ | 178 | 9.6 |
| Example 3 | $5.6 \times 10^5$ | 167 | 9.2 |
| Example 4 | $36.1 \times 10^5$ | 185 | 9.8 |
| Example 5 | $2.6 \times 10^5$ | 172 | 9.3 |
| Example 6 | $2.6 \times 10^5$ | 178 | 9.2 |
| Example 7 | $2.8 \times 10^5$ | 177 | 8.6 |
| Comparative Example 1 | $3.2 \times 10^5$ | 192 | 7.6 |
| Comparative Example 2 | $15.8 \times 10^5$ | 213 | 8.4 |
| Comparative Example 3 | $7.5 \times 10^5$ | 170 | 7.7 |
| Comparative Example 4 | $45.2 \times 10^5$ | 189 | 8.0 |

Evaluation 3: Evaluation on Properties of Ink after Filling (After Preservation)

Preserve each ink cartridge at 60° C. for one month and measure the number of coarse particles, 90% particle diameter, and pH of the inks in the ink cartridges.

Use the same measuring methods as specified above for the cases of Table 1.

The results are shown in Table 3.

TABLE 4

| | Number of coarse particles | 90% particle diameter (nm) | pH |
|---|---|---|---|
| Example 1 | $2.8 \times 10^5$ | 178 | 8.8 |
| Example 2 | $6.1 \times 10^5$ | 185 | 9.3 |
| Example 3 | $5.8 \times 10^5$ | 172 | 8.9 |
| Example 4 | $36.5 \times 10^5$ | 189 | 9.5 |
| Example 5 | $2.7 \times 10^5$ | 175 | 8.8 |
| Example 6 | $2.9 \times 10^5$ | 185 | 8.7 |
| Example 7 | $4.2 \times 10^5$ | 190 | 8.3 |
| Comparative Example 1 | $5.2 \times 10^5$ | 212 | 7.0 |
| Comparative Example 2 | $25.8 \times 10^5$ | 220 | 8.0 |
| Comparative Example 3 | $11.2 \times 10^5$ | 198 | 7.2 |
| Comparative Example 4 | $53.5 \times 10^5$ | 223 | 7.5 |

Evaluation 4: Evaluation on Discharging Stability of Filling Pigment Ink

Mount each ink cartridge for use in the Evaluation 3 to a printer after preservation followed by initial filling.

Preserve the ink cartridge at room temperature for one week and evaluate continuous printing.

Use a gel jet printer (IPSiO GX500, manufactured by RICOH CO., LTD.) as an evaluation machine and continuously print solid image charts without cleaning while consuming the same discharging amount of each color followed by checking when an image having a thin image density is printed for the first time during continuous printing.

The increasing number of coarse particles obtained from the difference between the initial properties and the after preservation properties shown in Tables 3 and 4 and the number of printed sheets are shown in Table 5.

TABLE 5

| | Increasing number of coarse particles during preservation | Number of printed sheets |
|---|---|---|
| Example 1 | $0.2 \times 10^5$ | 75 |
| Example 2 | $0.4 \times 10^5$ | 68 |
| Example 3 | $0.2 \times 10^5$ | 72 |
| Example 4 | $0.4 \times 10^5$ | 65 |
| Example 5 | $0.1 \times 10^5$ | 58 |
| Example 6 | $0.3 \times 10^5$ | 55 |
| Example 7 | $1.4 \times 10^5$ | 40 |
| Comparative Example 1 | $2.0 \times 10^5$ | 18 |
| Comparative Example 2 | $10.0 \times 10^5$ | 22 |
| Comparative Example 3 | $3.7 \times 10^5$ | 25 |
| Comparative Example 4 | $8.3 \times 10^5$ | 13 |

As seen from Table 5, it is possible to significantly reduce the increasing number of coarse particles in Examples 1 to 7 in comparison with Comparative Examples 1 to 4 and secure good discharging stability.

What is claimed is:

1. An ink cartridge comprising:
a holding member; and
an ink bag to accommodate ink;
wherein the ink bag is connected to the holding member;
wherein the ink cartridge is replenished with pigment ink having a pH higher than a pH of residual ink remaining in the ink cartridge; and wherein the residual ink remaining in the ink cartridge is pigment ink.

2. The ink cartridge according to claim 1, wherein the pigment ink comprises a pigment, a wetting agent, a surface active agent, and a pH controlling agent.

3. The ink cartridge according to claim 2, wherein the pH controlling agent comprises an alkane diol compound.

4. The ink cartridge according to claim 2, wherein when the ink cartridge is replenished and preserved for one month, the ink contained in the ink cartridge has a pH of 8.3 or higher with a 90% particle diameter of 190 nm or less.

5. The ink cartridge according to claim 1, wherein the filling is conducted without washing out an interior of the ink cartridge.

6. The ink cartridge according to claim 1, wherein the holding member comprises a supply port permits the ink bag to be filled with ink.

7. A method of replenishing an ink cartridge comprising:
filling the ink cartridge containing residual ink with a pigment ink having a pH higher than a pH of the residual ink; and wherein the residual ink remaining in the ink cartridge is pigment ink.

8. The method of replenishing an ink cartridge according to claim 7, further comprising:
measuring the pH of the residual ink remaining in the ink cartridge.

9. The method of replenishing an ink cartridge according to claim 7,
wherein the pigment ink comprises a pigment, a wetting agent, a surface active agent, and a pH controlling agent.

10. The method of replenishing an ink cartridge according to claim 9,
wherein the pH controlling agent is an alkane diol compound.

11. The method of replenishing an ink cartridge according to claim 9,
wherein when the ink cartridge is replenished and preserved for one month, the ink contained in the ink cartridge has a pH of 8.3 or higher with a 90% particle diameter of 190 nm or less.

12. The method of replenishing an ink cartridge according to claim 7,
wherein when the ink cartridge is replenished and preserved for one month, the ink contained in the ink cartridge has a pH of 8.3 or higher with a 90% particle diameter of 190 nm or less.

13. The method of replenishing an ink cartridge according to claim 7,
wherein the filling is conducted without washing out an interior of the ink cartridge.

14. The method of replenishing an ink cartridge according to claim 7, further comprising:
mixing the residual ink and the pigment ink in the ink cartridge after the filling.

15. An ink cartridge, comprising:
A mixed ink comprising a refill ink and a residual ink, wherein the refill ink has a higher pH than the pH of the residual ink,
wherein the refill ink is a pigment ink and the residual ink is a pigment ink.

16. The ink cartridge according to claim 15, wherein the mixed ink contains no dye.

* * * * *